United States Patent [19]

Torii et al.

[11] Patent Number: 4,886,714

[45] Date of Patent: Dec. 12, 1989

[54] PLATELIKE MAGNETIC POWDER AND A RECORDING MEDIUM WHICH USES THE PLATELIKE MAGNETIC POWDER

[75] Inventors: Hideo Torii, Higashiosaka; Masaki Aoki, Minou; Hideaki Komoda; Nobuyuki Aoki, both of Hirakata; Ikuo Ota, Yawata; Keiichi Ochiai, Hirakata, all of Japan

[73] Assignee: Matsushita Electric Industrial Co., Ltd., Osaka, Japan

[21] Appl. No.: 192,051

[22] Filed: May 9, 1988

[30] Foreign Application Priority Data

May 7, 1987 [JP] Japan ................... 62-111024

[51] Int. Cl.⁴ ........................... C04B 35/26
[52] U.S. Cl. .................. 428/694; 252/62.58; 252/62.59; 252/62.6; 252/62.62; 252/62.63
[58] Field of Search ............ 252/62.58, 62.59, 62.6, 252/62.62, 62.63; 423/59.4; 428/692, 694

[56] References Cited

U.S. PATENT DOCUMENTS 4,306,921 12/1981 Suzuki ..................... 252/62.55
4,584,242 4/1986 Nagai et al. .................. 252/62.63

FOREIGN PATENT DOCUMENTS 0214644 3/1987 European Pat. Off. .
58-2225 1/1983 Japan ..................... 423/594
61-136923 6/1986 Japan ..................... 423/594

OTHER PUBLICATIONS

Shirk, "Mat. Res. Bull,", vol. 5, No. 10, pp. 771–778, 1970.
Kiyama et al., "Advances in Ceramics", vol. 15, Fourth Int. Conf. on Ferrites, Part I, (The American Ceramics Society), p. 51 (1986).
Kubo et al., "IEEE Transactions on Magnetics", vol. MAG-18, p. 1122 (1982).
H. Kojima, "Ferromagnetic Materials", ed. E. P. Wohlforth, pp. 318–323 (North-Holland Pub. Co., Amsterdam, 1982).
Haneda et al., "Journal of the American Ceramic Society", vol. 57, No. 8, pp. 354–357 (1974).
Fuchikami, "J. Phys. Soc. Japan", vol. 20(5) pp. 760–769 (1985).

Primary Examiner—Jack Cooper
Attorney, Agent, or Firm—Wenderoth, Lind & Ponack

[57] ABSTRACT

The present invention provides a platelike magnetic powder made from a magnetic powder having particles each of which has a portion comprising the spinel type crystal structure and a portion comprising the magnetoplumbite type crystal structure. The magnetic powder provides a large saturation magnetization $\sigma s$ and a small temperature change $\Delta Hc/\Delta T$ of coercive force in the vicinity of the room temperature. Further, the present invention is to provide a high density magnetic recording medium which uses the magnetic powder. Furthermore, the present invention is to provide a method to easily manufacture the magnetic powder by the coprecipitation method. A raw material powder of superfine particles is prepared. The prepared powder is fired at a low temperature in a non-oxidizing atmosphere.

5 Claims, 3 Drawing Sheets

PARTICLE
PARTICLE
S
R

PLATELIKE MAGNETIC POWDER AND A RECORDING MEDIUM WHICH USES THE PLATELIKE MAGNETIC POWDER

BACKGROUND OF THE INVENTION

1. Field of the invention

The present invention relates to a coating type medium for high density magnetic recording such, for example, as oxide type platelike magnetic powder used as a material of high density magnetic tapes and high density floppy disks, and more particularly to a manufacturing method thereof and a magnetic recording medium which uses the magnetic powder.

2. Description of the Prior Art

Coating type magnetic recording medium is extensively used currently in the form of tapes for audio apparatuses, tapes for video tape recorders, floppy disks, and the like. In the past, $\gamma$-$Fe_2O_3$ (gamma iron oxide) acicular magnetic powder or Co coated $\gamma$-$Fe_2O_3$ acicular magnetic powder have been used for the medium of this coating type. Because the magnetic spin axes of these acicular magnetic powders point to the acicular direction thereof, the acicular magnetic powder is suitable as the magnetic powder used for the coating type medium of a longitudinal magnetic recording system.

In recent years, there has been an increasing demand among coating type media for higher magnetic recording density. In order to increase the magnetic recording density, magnetic powder is required to be composed of super minute particles from the aspect of the medium noise. However, as the size of particles of the abovementioned acicular magnetic powder is made smaller, it is impossible to manufacture magnetic powder of very fine particle size because the acicular magnetic powder has a property which causes loss of magnetism (super paramagnetism).

On the other hand, a totally different magnetic oxides from the abovementioned magnetic powder in chemical composition is a hexagonal ferrite magnetic powder, which has a magnetoplumbite type crystal structure. This powder is a magnetic powder in the hexagonal platelike form. A typical example is a hexagonal platelike magnetic powder of barium ferrite ($BaFe_{12}O_{19}$) type. Because of its very large uniaxial magnetic anisotropy, this powder is characterized by the fact that it does not lose its magnetism even if the powder is made into super minute particles. Therefore, this magnetic powder arrests attention as a magnetic powder that can be used for a high density magnetic recording medium.

Further, as compared with the abovementioned longitudinal magnetic recording system, a perpendicular magnetic recording system is given attention as a system which makes possible far higher density recording. Because it is difficult to manufacture a coating film on which conventional acicular magnetic powder are perpendicularly arranged in a row on the film surface, it is difficult to use the abovementioned acicular powder in view of its shape, as a magnetic powder for magnetic recording medium corresponding to the perpendicular magnetic recording system. The abovementioned hexagonal platelike magnetic powder also draws attention as magnetic powder for the coating type medium correspondint to the perpendicular magnetic recording system. This has arisen from the magnetic characteristics of this powder. That is, this powder comes in hexagonal platelike form with grown C plane ((001)-plane) and has a construction wherein the magnetic spin axis is caused to point in the perpendicular direction (c axis) to this plate surface (for example, Osamu Kubo, Applied Physics (Japan), Volume 55, No.2 (1986), page 135).

As stated above, the magnetic spin axis points perpendicularly to the plate surface of the platelike particle has arisen from the fact that the magnetic spin axis has magnetoplumbite type crystal structure. Crystal structure units of magnetoplumbite type oxide of iron represented by barium ferrite are composed of two S blocks having the same structure as the spinel type crystal structure comprising iron and oxygen and one R block comprising barium-iron-oxygen (H. Kojima: Ferromagnetic Materials, ed, E. P. Wohlfarth, North-Holland Publishing Company, Amsterdam, 1982, p. 318 to 323).

A schematic diagram showing this crystal structure is shown in FIG. 1. Sandwiching the R block, the S blocks are disposed in vertical direction to form the stacked S-R-S construction. In addition, the stacking direction of this S-R-S construction coincide with the C axis direction of the the magnetoplumbite construction. Viewing each of the S blocks of the spinel type crystal structure, the direction (111) coincides with the stacking direction of the S-R-S construction. Because the iron ion disposed with five oxygen existing in the R block at the center of the unit of this magnetoplumbite construction acts so as to orient the magnetic spin axis of the vertical S blocks into the same direction, the magnetic spin axis will eventually exist to face the S-R-S stacked direction (direction of c axis), that is, to face a direction perpendicular to the plate surface of the hexagonal platelike particles (Soshin Chikazumi: Physics of Ferromagnetism, vol. I, (Syokabo, Tokyo, 1978) p. 228 to 230, [in Japanese], and N. Fuchikami, J. Phys. Soc. Japan, 20, 760 (1965)).

Therefore, when manufacturing a coating type medium, by providing on the base film a coating film of a structure in which hexagonal platelike particles are arranged in close rows, the magnetic spin used for magnetic recording will face toward the perpendicular direction with respect to the surface of the medium, so that a coating type media of perpendicular magnetic recording system can be realized. In other words, this medium shows particles in the form of hexagonal platelike configuration and can be achieved only by the existence of hexagonal ferrite type oxides having magnetoplumbite type crystal structure. FIG. 2 shows a model of the coating type perpendicular magnetic recording medium which uses the abovementioned hexagonal platelike magnetic powder of hexagonal ferrite.

In order to manufacture a recording medium which uses the perpendicular magnetic recording system such as above, it is necessary to orient the abovementioned hexagonal platelike magnetic powder of hexagonal ferrite so that the platelike surface (the c plane of hexagonal ferrite in terms of crystallography) thereof is parallel to the running surface of the magnetic head of the medium, and to coat the magnetic powder on a substrate such as a base film. Because the magnetic powder is oriented and coated in the above manner, various coating methods are designed. Generally, as the platelike ratio of the magnetic powder particles, that is, the diameter/thickness ratio, is greater, the orientation becomes easier.

Of the magnetic characteristics of magnetic powder, the saturation magnetization $\sigma s$ and the temperature change $\Delta Hc/\Delta T$ of coercive force Hc in particular largely influence the characteristics of the coating type magnetic recording medium which uses such magnetic powder. As the value $\sigma s$ of the magnetic powder increases, the signal output of the medium increases. Further, because the coercive force Hc of the magnetic powder influences the stability and writable performance of the recording signal of such medium, as the value $\Delta Hc/\Delta T$ becomes smaller, it becomes more possible to manufacture an excellent medium.

The $\gamma$-$Fe_2O_3$ acicular iron oxide of the spinel type crystal structure used conventionally in the longitudinal magnetic recording has a large saturation magnetization value of $\sigma s = 70$ to $80$ emu/g and a temperature change $\Delta Hc/\Delta T$ of coercive force which has a small negative value of about $-1$ Oe/deg in the vicinity of the room temperature. However, the hexagonal ferrite magnetic powder of magnetoplumbite type stated above has a relatively small value of $\sigma s$ and a large positive value of $\Delta Hc/\Delta T$ in the vicinity of the room temperature. For example, in the case of barium ferrite hexagonal plate-like magnetic powder, which is a typical hexagonal ferrite magnetic powder, the saturation magnetization value is $\sigma s = 57$ emu/g and the temperature change of coercive force is $\Delta Hc/\Delta T \simeq +3$ to $+6$ Oe/deg. (For example, T. Fukaya, T. Oguchi, H. Takeuchi, S. Hideyama and H. Yokoyama, Jornal of Japan Society of Applied Magnetics, vol. 10, p. 81 (1986) [in Japanese])

As a manufacturing method of these hexagonal ferrite magnetic powders, methods such as the hydrothermal method and glass crystallization method have been established. (For hydrothermal method, refer to M. Kiyama, T. Takada, N. Nagai and N. Horiishi, "Advances in Ceramics, vol. 15, Fourth International Conference on Ferrite, Part 1" (The American Ceramic Society), p. 51 (1986), and for glass crystallization, refer to O. Kubo, T. Ido, and H. Yokoyama, IEEE Transactions on Magnetics, vol. MAG-18, p. 1122 (1982), for example).

These methods are suitable for manufacturing single crystal fine particle of balanced stable phase having stoichiometric composition.

In addition to the hydrothermal method and glass crystallization method, coprecipitation and tempering method are also available as another manufacturing method of conventional hexagonal ferrite (For example, K. Haneda, C. Miyama and H. Kojima, Journal of The American Ceramics society, vol. 57, p. 354 (1974).).

This is a method wherein coprecipitated superfine particle raw material powder which includes Fe and M (M=Ba, Sr, Pb) with mol ratio of 12/1 as [Fe]/[M] is tempered in the air to synthesize hexagonal ferrite magnetic powder. With this method however, because the atmosphere used for tempering is the air, that is, the oxidizing atmosphere, hexagonal ferrite phase of magnetoplumbite structure is not formed directly from the raw material powder, but the non-magnetic $\alpha$-$Fe_2O_3$ (hematite) phase is formed as an intermediate quasi-stable phase during reaction process. Hexagonal ferrite phase is formed after the intermediate quasi-stable phase is changed again. Further, because it requires a high temperature of over 850° C. to change from the $\alpha$-$Fe_2O_3$ phase to the hexagonal ferrite phase, hexagonal ferrite magnetic powder cannot be obtained unless the raw material powder is fired at a temperature above 850° C. Because the high temperature tempering is necessary, the coprecipitation and tempering method has such defects that (i) large particles that have grown abnormally are liable to be mixed in the magnetic powder to be manufactured and (ii) a crushing process is required in the manufacturing process of magnetic powder because the powder is liable to cause sintering.

Furthermore, because the raw materials are fired in the oxidizing atmosphere with this coprecipitation and tempering method, when coprecipitated powder which contain more Fe ions than the stoichiometric mol ratio (12:1) as compared to M ions are fired, iron of excessive quantity which is over 12 times the mole number of M becomes the non-magnetic $\alpha$-$Fe_2O_3$ phase. Thus the lowered magnetic characteristics of the synthesized magnetic powder (particularly of the saturation magnetization) result. In other words, only the hexagonal ferrite magnetic powder of stoichiometric composition can be obtained even if the coprecipitation and tempering method is used.

That is to say, in the conventional methods, only the magnetoplumbite type hexagonal ferrite ($MFe_{12}O_{19}$ (M=Ba, Sr, Pb)) magnetic powder of materially stoichiometric composition can be manufactured.

SUMMARY OF THE INVENTION

An object of the present invention is to provide an oxide type platelike magnetic powder which can be used as a coating type high density magnetic recording medium, particularly as a magnetic powder used for perpendicular magnetic recording medium, and solve two defects in the prior art: one is the small saturation magnetization value $\sigma s$ of the barium ferrite magnetic powder having magnetoplumbite type crystal structure; and the other is the large temperature change in value $\Delta Hc/\Delta T$ (temperature coefficient) of the coercive force Hc.

Another object of the present invention is to provide a method to manufacture the abovementioned magnetic powder easily.

A further object of the present invention is to provide a magnetic recording medium in which the abovementioned magnetic powder is used.

In order to achieve the above objects, the magnetic powder of the present invention is an oxide type platelike magnetic powder which has two types of crystal structures in a same particle: one type of crystal structure is the magnetoplumbite type crystal structure which is the crystal structure of hexagonal platelike magnetic powder of hexagonal ferrite such as the existing barium ferrite magnetic powder; and the other type of crystal structure is the spinel type crystal structure. To be more specific, as shown in FIG. 1, considering oxygen ion arranged layers on the c plane of a magnetoplumbite type crystal structure iron oxide having a basic composition of $MFe_{12}O_{19}$ (where M is a metallic element comprising at least one of Ba, Sr, Pb and Ca), when a crystal block of $MFe_4O_7$ composition comprising three atomic layers having layers of nine $O^{2-}$ ions respectively above and under a layer of one $M^{2+}$ ion and three $O^{2-}$ ions is defined as an R block and when a crystal block of $Fe_6O_8$ composition comprising two layers of $O^{2-}$ ions which are disposed symmetrically with respect to this R block is defined as a S block, the magnetoplumbite structure iron oxide can be indicated by the -S-R-S-R-S-R construction. That is, layers of R block contributing largely to the magnitude of the coercive force Hc of the substance and layers of S block contributing largely to the magnitude of saturation magnetization $\sigma s$ are stacked alternately. Since there are less $M^{2+}$ ions necessary for forming the R block, the magnetic powder of the present invention is a platelike magnetic powder of oxide type in which a part of the R block layer is lacking. Therefore, it is a platelike magnetic powder of oxide type in which S blocks exist excessively relative to R blocks. FIG. 3 shows a model diagram of the construction of the magnetic powder according to the present invention.

The chemical composition of the oxide type platelike magnetic powder is characterized by a composition formula expressed generally by

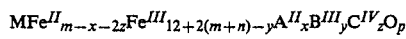
$$MFe^{II}_{m-x-2z}Fe^{III}_{12+2(m+n)-y}A^{II}_xB^{III}_yC^{IV}_zO_p$$

In the formula, M is a metallic element comprising a combination of one or more of Ba, Sr, Pb and Ca; A, B and C are metallic elements which are respectively ionized to become bivalent ion, trivalent ion and quadrivalent ion; x, y and z denote 0 or positive numbers; p is the number of oxygens satisfying electric neutrality and is a positive number; and m and n are positive numbers satisfying the relation of $21.30 \geq 12+3m+2n-z \geq 14.90$. This oxide type platelike magnetic powder can be used for the coating type high density magnetic recording medium.

The oxide type platelike magnetic powder according to the present invention has particles each of which has the magnetoplumbite type crystal structure and the spinel type crystal structure. For this reason, as compared with the hexagonal platelike magnetic powder of hexagonal ferrite consisting only of the conventional magnetoplumbite type crystal structure, it is possible for the magnetic powder of the present invention to have high saturation magnetization $\sigma s$ and to have small $\Delta Hc/\Delta T$ in the vicinity of the room temperature.

Furthermore, with the magnetic powder of the present invention, by controlling the proportion of the volume of the part having the spinel type crystal structure in the particle, it becomes possible to freely control $\sigma s$ or $\Delta Hc/\Delta T$ value.

Because the magnetic spin of the spinel type crystal structure in one particle has an interaction with the magnetic spin of the spinel block in the magnetoplumbite type crystal structure, the magnetic spin of the spinel type crystal structure will face the same direction of the spin axis of the magnetoplumbite type crystal structure, that is, the S-R-S stacking direction (the direction of the c axis) of the magnetoplumbite type crystal structure. Namely, the spin axis will face the perpendicular direction of the plate surface of the platelike particle.

As have been described above, the oxide type platelike magnetic powder of the present invention can be used as the magnetic powder for high density magnetic recording medium including the perpendicular magnetic recording medium, although the platelike magnetic powder of the present invention is different in composition and crystal structure from those of the platelike magnetic powder of hexagonal ferrite such as the conventional barium ferrite magnetic powder. Because the magnetic powder of the present invention does not have a stoichiometrically balanced stable phase possessed by the conventional magnetic powder, it cannot be easily manufactured with a conventional hydrothermal method or a glass crystallization method.

Further, even if the conventional coprecipitation and firing method was used, it is impossible to obtain the magnetic powder having high magnetic characteristic, the saturation magnetization in particular, of excessive phase in the spinel type crystal structure containing iron of over 12 times with respect to M such as the magnetic powder of the present invention.

The manufacturing method of the present invention designed to achieve the above object of manufacturing the magnetic powder is to manufacture the oxide type platelike magnetic powder of the present invention through a solid phase reaction by synthesizing a raw material powder of superfine particles which comprise a mixture of compounds such as oxide, hydroxide, nitrate and oxalate, containing M, Fe, A, B and C which constitute the chemical composition of the magnetic powder of the present invention, and by firing the raw material powder at a low temperature in a non-oxidizing atmosphere.

In addition to the method to synthesize the above-mentioned superfine particle raw material powder, methods such as the coprecipitation method, freeze-dry method and spray-dry method of aqueous solution can be considered. As an example, a synthesizing method of the present invention for synthesizing the superfine particle raw material powder by the coprecipitation method will be hereafter described.

An acid aqueous solution containing M ion (M ion is a cation which is made into hexagonal ferrite of Fe ion and magnetoplumbite structure that can be expressed by $MFe_{12}O_{19}$, and more specifically is either $Ba^{2+}$ ion, $Sr^{2+}$ ion or $Pb^{2+}$ ion or a mixture of two or more of these ions), iron ions of over 12 times in mole ratio with respect to this M ion, and small amount of added metal ions of $A^{2+}$, $B^{3+}$ and $C^{4+}$ is prepared. An alkaline aqueous solution such as NaOH or KOH or $NH_4OH$ is added to the prepared solution cause superfine particles containing elements of M, Fe, A, B and C to be coprecipitated. The coprecipitated superfine particles obtained in the above manner are dried to obtain superfine particle raw material powder.

The superfine particle raw material powder obtained by the coprecipitation method is fired in a non-oxidizing atmosphere at a low temperature range of 650° C. to 850° C., so that the oxide type platelike magnetic powder for magnetic recording is manufactured. In this case, the manufactured oxide type platelike magnetic powder has magnetic anisotropy in perpendicular direction to the plate surface, and has, due to the solid phase reaction, the magnetoplumbite phase and the spinel phase in a same particle.

The abovementioned non-oxidizing atmosphere is a reducing atmosphere produced by a tempering method in which superfine particle raw material powder is mixed with a solid reducing agent such as carbon powder and fired in nitrogen gas, or a neutral atmosphere in inert gas such as nitrogen gas or argon, or a reducing gas atmosphere in inert gas (nitrogen gas or argon gas) mixed with a small amount of hydrogen gas.

As described above, because the excessive iron will be tempered in a non-oxidizing atmosphere by this manufacturing method, except for the excessive iron consumed for the magnetoplumbite structure in the composition of the superfine particle raw material powder, the excessive iron cannot be turned into $\alpha\text{-}Fe_2O_3$ phase but into spinel phase. Therefore, it is possible to manufacture the oxide type platelike magnetic powder of the present invention by the manufacturing method according to the present invention.

In addition, in the manufacturing method of the present invention, by controlling the quantity of the above-mentioned excessive iron in the superfine particle raw material powder, it becomes possible to control the existence ratio of the magnetoplumbite phase and the spinel phase in the oxide type platelike magnetic powder. That is, if the manufacturing method of the present invention is used, it is possible to obtain the powder which has a controlled magnetic characteristic of the abovementioned oxide type platelike magnetic powder.

Further, by manufacturing a coating type magnetic recording medium by using the oxide type platelike magnetic powder of the present invention as the raw material magnetic powder, it becomes possible to obtain a coating type high density magnetic recording medium which has high saturation magnetization Ms per volume of the medium and small temperature change $\Delta Hc/\Delta T$ (temperature coefficient) of the coercive force in the vicinity of the room temperature as compared with the medium for which the conventional hexagonal ferrite magnetic powder is used.

DESCRIPTION OF THE PREFERRED EMBODIMENTS Example 1

270.30 g of ferric chloride ($FeCl_3 \cdot 6H_2O$), 19.16 g of barium chloride ($BaCl_2 \cdot 2H_2O$), 20.90 g of nickel chloride ($NiCl_2 \cdot 6H_2O$), and 16.37 g of titanium tetrachloride ($TiCl_4$) were dissolved in water to prepare 2.0 liters of acid aqueous solution. This solution was mixed at the room temperature with 1.0 liter of alkaline aqueous solution prepared by dissolving 44.75 g of $NaB_4O_7 \cdot 10H_2O$ and 200 g of NaOH into water beforehand to obtain an aqueous suspension. This aqueous suspension was subjected to aging for one hour at 60° C. to produce coprecipitate. The coprecipitate was washed, filtered, and dried to synthesize coprecipitated superfine particle raw material powder. This raw material powder sample is CP-1 shown in Table 1.

In the same manner as above, by changing the type and quantity of the metallic salt used for synthesizing the raw material powder sample, raw material powder samples CP2 through CP21 shown in Table 1 were synthesized. Respective samples were analyzed by chemical analyses to obtain chemical compositions thereof.

Figure 1:
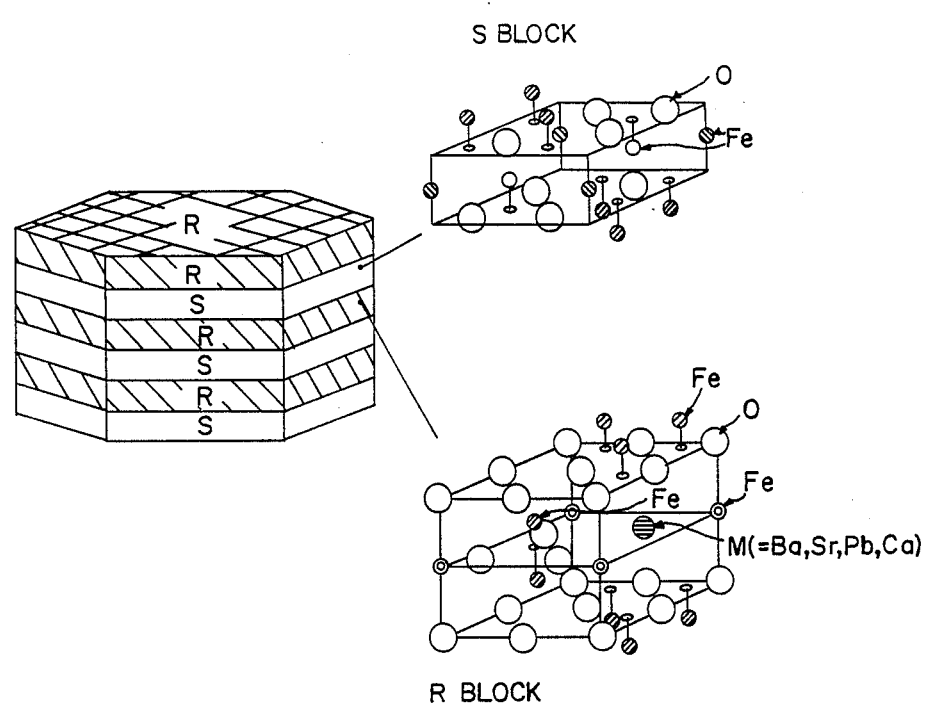
FIG. 1 is a schematic diagram showing the construction of the hexagonal ferrite having the conventional magnetoplumbite type crystal structure.
Figure 2:
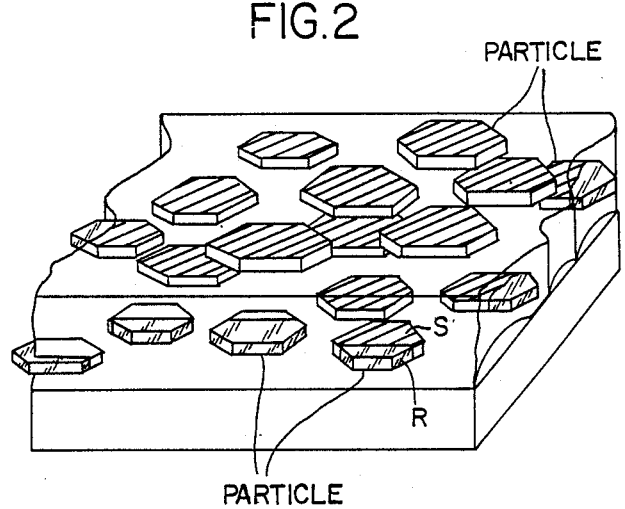
FIG. 2 is a schematic diagram showing the arrangement of the magnetic powder of the coating film in the perpendicular magnetic recording type coating type medium which uses the hexagonal platelike magnetic powder of hexagonal ferrite.
Figure 3:
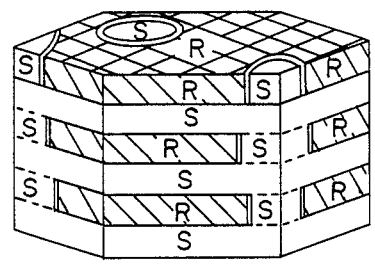
FIG. 3 is a schematic diagram showing a structure of the oxide type platelike magnetic powder of the present invention.
Figure 4:
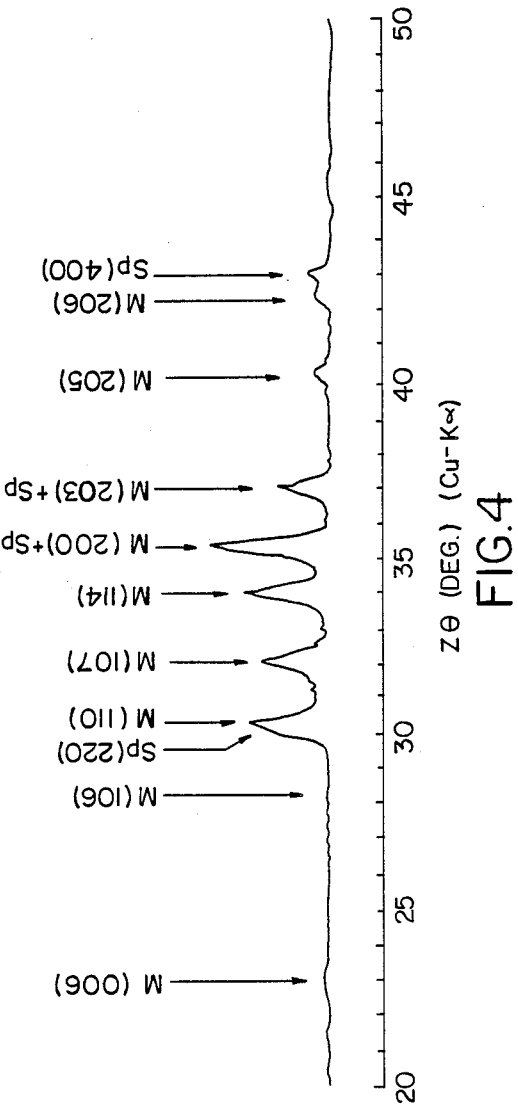
FIG. 4 shows XRD (X-ray diffraction) of the magnetic powder of the present invention in Example 1.

30 g of the above raw material powder sample CP-1 was put into a metallic drum, rotated while stirring, heat treated in $N_2$ current for one hour at 720° C. to obtain a magnetic powder sample of the present invention. This sample was assigned with a sample number MP-1. The obtained magnetic powder sample MP-1 was observed as to the shape and size of grains thereof with a transmissive electron microscope. It was found that the sample MP-1 was a platelike powder whose average plate-shape ratio was 10 and average grain diameter was 0.1 $\mu$m. Magnetic characteristic was measured with a VSM. The value of $\sigma s$ was 60.1 emu/g when Hc was 900 Oe. Further, $\Delta Hc/\Delta T$ at 15 to 100° C. was +0.2 Oe/deg. Type of crystal phase was investigated by X-ray diffraction (XRD). As a result, it was found out that the phase was a mixed phase of the magnetoplumbite phase and the spinel phase. The XRD patterns thereof are shown in FIG. 4. Regular crystals are shown in detail in Table 2.

The magnetic powder sample MP-1 was analyzed chemically, and found that the mole ratio of the metallic ions thereof conicided with the mole ratio of the metallic ions of the raw material sample CP-1 which was used for synthesizing the sample MP-1.

Similarly, the precipitated raw material powders shown in Table 1 were subjected to heat treating in $N_2$ current under different conditions to obtain oxide platelike magnetic powder samples MP-2 through MP-18 shown in Table 2.

Two raw material powder samples shown in Table 1 were heat treated in $N_2$ gas at a low temperature of below 680° C. and at a high temperature of above 850° C. to obtain comparison samples MP-19 and MP-20 shown in Table 2. Three raw material powder samples were heat treated in air to obtain comparison samples MP-21 through MP-23 shown in Table 2.

Chemical analyzes showed that the raw material powder samples shown in Table 1 and the magnetic powder samples shown in Table 2 which were synthesized by using the raw material powder samples of Table 1 were the same in mole ratio of metallic ions.

As can be seen from Table 1 and Table 2, by firing a superfine particle raw material powder with chemical composition whose mole ratio $$\frac{[Fe^{II}] + [Fe^{III}] + [A] + [B] + [C]}{[M]}$$

is 12 or more in nitrogen gas at a temperature range from 680° C. to 850° C., it is possible to manufacture an oxide type platelike magnetic powder whose average particle diameter (D) is 0.30 to 0.15 $\mu$m, average plate-phape ratio (D/t where t is thickness) is 5 to 18, and Hc$\leq$1500 Oe. This powder had a mixed phase of the magnetoplumbite phase and the spinel phase.

By selecting a raw material powder with mole ratio $$\frac{[Fe^{II}] + [Fe^{III}] + [A] + [B] + [C]}{[M]}$$

of 14.90 or more, it is possible to manufacture a powder of $-1 < \Delta Hc/\Delta T < 1$.

TABLE 1

| No. | Sample No. | $\frac{[Fe^{III}] + [Fe^{II}] + [A] + [B] + [C]}{[M]}$ Mole ratio | M Ba | Sr | Pb | Ca | Fe | Co | Cu | A Ni | Zn | Mn | B Cr | Al | In | C Ti | Zr | Ge | Sn |
|---|---|---|---|---|---|---|---|---|---|---|---|---|---|---|---|---|---|---|---|
| 1 | CP-1 | 14.97 | 1.0 | — | — | — | 12.75 | — | — | 1.12 | — | — | — | — | — | 1.10 | — | — | — |
| 2 | CP-2 | 14.90 | 1.0 | — | — | — | 12.78 | 0.92 | — | — | 0.19 | — | — | — | — | 1.10 | — | — | — |
| 3 | CP-3 | 15.00 | 1.0 | — | — | — | 12.96 | 0.81 | 0.10 | — | 0.20 | — | — | — | — | 0.93 | — | — | — |
| 4 | CP-4 | 15.10 | 1.0 | — | — | — | 12.98 | 0.90 | — | — | — | — | — | — | — | 1.13 | — | — | — |
| 5 | CP-5 | 16.01 | 0.95 | — | — | 0.05 | 12.35 | 1.86 | — | — | — | — | — | — | — | 1.80 | — | — | — |
| 6 | CP-6 | 16.02 | 1.0 | — | — | — | 14.29 | 0.81 | — | — | — | — | — | — | — | 0.92 | — | — | — |
| 7 | CP-7 | 15.92 | — | 1.0 | — | — | 14.20 | 0.81 | — | — | — | — | — | — | — | 0.91 | — | — | — |
| 8 | CP-8 | 16.12 | 1.0 | — | 0.05 | — | 14.40 | 0.81 | — | — | 0.20 | — | — | — | — | 0.91 | — | — | — |
| 9 | CP-9 | 16.12 | 0.95 | — | — | — | 13.80 | — | — | 1.12 | — | — | — | — | — | 0.92 | 0.08 | — | — |
| 10 | CP-10 | 16.07 | 1.0 | — | — | — | 14.20 | 0.81 | — | — | — | — | — | — | — | 0.91 | — | 0.05 | 0.10 |
| 11 | CP-11 | 16.03 | 1.0 | — | — | — | 14.20 | 0.82 | — | — | — | — | 0.10 | — | — | 0.92 | — | — | — |
| 12 | CP-12 | 16.00 | 1.0 | — | — | — | 14.17 | 0.81 | — | — | — | — | — | 0.11 | — | 0.91 | — | — | — |
| 13 | CP-13 | 15.97 | 1.0 | — | — | — | 14.15 | 0.81 | — | — | — | — | — | — | 0.10 | 0.91 | — | — | — |
| 14 | CP-14 | 18.04 | 1.0 | — | — | — | 16.60 | 0.70 | — | — | — | 0.18 | — | — | — | 0.74 | — | — | — |
| 15 | CP-15 | 17.80 | 1.0 | — | — | — | 16.24 | 0.70 | — | — | — | — | 0.10 | 0.11 | — | 0.75 | — | — | — |
| 16 | CP-16 | 17.78 | 1.0 | — | — | — | 15.90 | 0.70 | — | — | 0.20 | — | — | — | — | 0.70 | 0.08 | — | — |
| 17 | CP-17 | 18.10 | 1.0 | — | — | — | 16.40 | 0.70 | — | — | — | — | — | — | — | 0.92 | — | — | — |
| 18 | CP-18 | 21.30 | 1.0 | — | — | — | 19.10 | 1.35 | — | — | — | — | — | — | — | 0.85 | — | — | — |
| 19 | CP-19 | 12.00 | 1.0 | — | — | — | 10.90 | 0.54 | — | — | — | — | — | — | — | 0.56 | — | — | — |
| 20 | CP-20 | 14.01 | 1.0 | — | — | — | 11.61 | 1.20 | — | — | — | — | — | — | — | 1.20 | — | — | — |
| 21 | CP-21 | 14.00 | 1.0 | — | — | — | 12.90 | 0.55 | — | — | — | — | — | — | — | 0.55 | — | — | — |

TABLE 2

| No. | Sample No. | Raw material No. (in Table 1) | Synthesizing conditions Firing temperature | Firing atmosphere | Magnetic characteristics Hc (Oe) | σs (emu/g) | ΔHc/ΔT (Oe/deg) | Shape Average particle diameter D (μm) | Diameter/ thickness D/t | Crystal phase by XRD | $\frac{[Fe^{2+}]}{[Fe^{2+}]+[Fe^{3+}]}$ Mole ratio (%) |
|---|---|---|---|---|---|---|---|---|---|---|---|
| 1 | MP-1 | CP-1 | 720 | $N_2$ | 900 | 60.1 | +0.2 | 0.10 | 10 | M + S | 0 |
| 2 | MP-2 | CP-2 | 720 | $N_2$ | 1410 | 61.5 | +0.1 | 0.10 | 6 | M + S | 0 |
| 3 | MP-3 | CP-3 | 680 | $N_2$ | 1210 | 60.8 | +0.8 | 0.08 | 8 | M + S | 0 |
| 4 | MP-4 | CP-4 | 680 | $N_2$ | 780 | 59.6 | +0.8 | 0.08 | 8 | M + S | 0 |
| 5 | MP-5 | CP-5 | 700 | $N_2$ | 620 | 60.2 | −0.1 | 0.08 | 8 | M + S | 0 |
| 6 | MP-6 | CP-6 | 700 | $N_2$ | 800 | 61.0 | −0.2 | 0.10 | 10 | M + S | 0 |
| 7 | MP-7 | CP-7 | 720 | $N_2$ | 1050 | 61.3 | −0.1 | 0.10 | 10 | M + S | 0 |
| 8 | MP-8 | CP-8 | 720 | $N_2$ | 600 | 60.8 | −0.1 | 0.15 | 10 | M + S | 0 |
| 9 | MP-9 | CP-9 | 720 | $N_2$ | 680 | 58.2 | −0.2 | 0.15 | 12 | M + S | 0 |
| 10 | MP-10 | CP-10 | 700 | $N_2$ | 700 | 57.3 | +0.2 | 0.10 | 18 | M + S | 0 |
| 11 | MP-11 | CP-11 | 750 | $N_2$ | 1100 | 58.0 | −0.1 | 0.10 | 8 | M + S | 0 |
| 12 | MP-12 | CP-12 | 800 | $N_2$ | 800 | 64.1 | 0.0 | 0.15 | 6 | M + S | 0 |
| 13 | MP-13 | CP-13 | 680 | $N_2$ | 800 | 55.7 | −0.2 | 0.08 | 8 | M + S | 0 |
| 14 | MP-14 | CP-14 | 700 | $N_2$ | 600 | 58.1 | −0.5 | 0.08 | 8 | M + S | 0 |
| 15 | MP-15 | CP-15 | 780 | $N_2$ | 700 | 62.2 | −0.8 | 0.12 | 8 | M + S | 0 |
| 16 | MP-16 | CP-16 | 700 | $N_2$ | 900 | 60.0 | −0.9 | 0.06 | 5 | M + S | 0 |
| 17 | MP-17 | CP-17 | 680 | $N_2$ | 540 | 57.5 | −1.0 | 0.10 | 14 | M + S | 0 |
| 18 | MP-18 | CP-20 | 680 | $N_2$ | 600 | 50.8 | +2.5 | 0.08 | 10 | M + S | 0 |
| 19* | MP-19 | CP-4 | 660 | $N_2$ | 1800 | 29.3 | — | — | — | M + S + P | 0 |
| 20* | MP-20 | CP-6 | 880 | $N_2$ | 790 | 64.5 | 0.0 | 0.80 | 4–8 | M + S | 0 |
| 21* | MP-21 | CP-4 | 700 | air | 2000 | 35.0 | — | 0.12 | 18 | M + H | 0 |
| 22* | MP-22 | CP-4 | 750 | air | 2200 | 35.8 | — | 0.15 | 16 | M + H | 0 |
| 23* | MP-23 | CP14 | 700 | air | 2200 | 28.6 | — | 0.12 | 15 | M + H | 0 |

*Comparison samples

Example 2

TABLE 3

| No. | Sample No. | Raw material powder No. | Synthesizing condition Firing temperature | Firing atmosphere $H_2$ % | $N_2$ % | Magnetic characteristics Hc (Oe) | σs (emu/g) | ΔHc/ΔT (Oe/deg) | Shape Average particle diameter D(μm) | Diameter/ thickness D/t | Crystal phase by XRD | $\frac{[Fe^{2+}]}{[Fe^{2+}]+[Fe^{3+}]}$ Mole ratio (%) |
|---|---|---|---|---|---|---|---|---|---|---|---|---|
| 1 | MPH-1 | CP-14 | 680 | 0.5 | 99.5 | 500 | 60.2 | −0.9 | 0.03 | 2 to 3 | M + S | 1.2 |
| 2 | MPH-2 | CP-17 | 700 | 0.3 | 99.7 | 540 | 63.2 | −0.8 | 0.06 | 6 | M + S | 1.3 |
| 3 | MPH-3 | CP-18 | 720 | 1.0 | 99.0 | 650 | 67.0 | −1.0 | 0.12 | 8 | M + S | 2.5 |
| 4 | MPH-4 | CP-16 | 700 | 0.7 | 99.3 | 710 | 65.8 | −1.0 | 0.10 | 6 | M + S | 1.8 |
| 5 | MPH-5 | CP-9 | 720 | 0.5 | 99.5 | 760 | 63.2 | −0.5 | 0.12 | 10 | M + S | 0 |
| 6 | MPH-6 | CP-3 | 680 | 0.3 | 99.7 | 760 | 54.6 | −0.2 | 0.10 | 13 | M + S | 0 |
| 7* | MPH-7 | CP-19 | 720 | 0.1 | 99.9 | 790 | 47.5 | +3.2 | 0.10 | 8 | M + S | 0 |
| 8* | MPH-8 | CP-4 | 860 | 0.3 | 99.7 | 600 | 59.6 | −2.0 | 0.50 | 4 to 6 | M + S | 0.3 |

30 g of the raw material powder sample CP-14 shown in Table 1 of Example 1 was put into a metallic drum and heat treated, while rotating the drum, at 680° C. for one hour in nitrogen gas containing 0.5% hydrogen gas thereby to synthesize a magnetic powder sample. This sample was assigned a sample number MPH-1. This sample MPH-1 was investigated in the same manner as Example 1. The results are shown in No. 1 in Table 3.

In the same manner as above, magnetic powder samples were manufactured under different synthesizing conditions using other raw material powders. The results are shown in Nos. 2 to 6 in Table 3.

As a comparative sample, a synthesized sample manufactured from a raw material powder having ([$Fe^{II}$]+[$Fe^{III}$]+[A]+[B]+[C])/[M] mole ratio of 12.00 is shown in No. 7. A comparative sample which was fired at 860° C. is shown in No. 8.

As shown above, when the raw material powder synthesized by the coprecipitation method was heat treated in a reduced atmosphere of nitrogen gas containing hydrogen, it was found out that the synthesized powder has a similar shape as that of the magnetic powder shown in Example 1 and that an oxide type platelike magnetic powder that contains $Fe^{2+}$ ions in the chemical composition thereof can be obtained.

Example 3

30 g of the raw material powder CP-17 shown in Table 1 of Example 1 was mixed with 0.39 g of superfine carbon particle powder having average particle diameter of 0.02 μm. This mixture was put into a metallic drum to synthesize a magnetic powder sample by heat treating the mixture in nitrogen gas at 680° C. for one hour while rotating the metallic drum. The sample was assigned the sample number MPC-1. The sample MPC-1 was investigated in the same manner as Example 1. The results were shown in No.1 in Table 4.

In the same manner as above, magnetic powders manufactured under different synthesizing conditions using other raw material powders are shown in Nos.2 to 5 in Table 4.

Even if carbon powder was mixed with the raw material powder and heat treated in the inert nitrogen gas, it was found out that the same oxide type platelike magnetic powder as that which was heat treated in the nitrogen gas mixed with small amount of the hydrogen shown in the Example can be obtained.

TABLE 4

| No. | Sample No. | Raw Material No. (in Table 1) | Synthesizing condition Firing temperature | (Carbon) (Raw material powder) | Magnetic characteristics Hc (Oe) | $\sigma s$ (emu/g) | $\Delta Hc/\Delta T$ (Oe/deg) | Shape Average particle diameter D ($\mu m$) | Diameter/ thickness D/t | Crystal phase by XRD | $\dfrac{[Fe^{2+}]}{[Fe^{2+}]+[Fe^{3+}]}$ Mole ratio (%) |
|---|---|---|---|---|---|---|---|---|---|---|---|
| 1 | MPC-1 | CP-17 | 680 | 1.3 | 490 | 64.3 | −0.9 | 0.08 | 6 | M+S | 2.0 |
| 2 | MPC-2 | CP-18 | 720 | 1.3 | 480 | 65.8 | −1.0 | 0.12 | 6 | M+S | 3.6 |
| 3 | MPC-3 | CP-10 | 700 | 0.7 | 560 | 61.0 | −0.3 | 0.10 | 10 | M+S | 2.2 |
| 4 | MPC-4 | CP-1 | 720 | 0.5 | 750 | 61.0 | +0.2 | 0.12 | 8 | M+S | 1.8 |
| 5 | MPC-5 | CP-2 | 720 | 0.3 | 1050 | 61.5 | +0.8 | 0.10 | 6 | M+S | 1.9 |

Example 4

A magnetic recording medium using the oxide type platelike magnetic powder of the present invention will be described.

With respect to 100 weight part of the magnetic powder of the present invention shown in Examples 1, 2, and 3, a mixture of 10 weight part of vinyl chloride-vinyl acetate copolymer, 10 weight part of polyurethane resin, 2 weight part of olein acid, 5 weight part of carbon black, 5 weight part of α-alumina, 120 weight part of toluene, 120 weight part of methyl-ethyl-ketone, and 80 weight part of cyclohexanon, was mixed to be dispersed for ten hours using a sand mill, thereby to obtain a magnetic paint. In addition, the magnetic paint was added with 6 weight part of polyisocyanate, mixed and dispersed, and filtered with a paper filter.

The filtered paint was coated on a PET (polyethylene telephthalate) of 15 $\mu m$ film thickness and left to dry. Then, the paint surface was calendered for smoothing, slitted to a specified width, whereby a magnetic tape for measurement was made. The VMS was used to measure a temperature change of the coercive force of the obtained magnetic tape. Reproduction output power was also measured. The reproduction output power was measured at 3.75 m/sec. of head-tape relative speed with a ring head of 0.25 $\mu m$ gap length and 21.5 $\mu m$ track width. The results are shown in Table 5.

For comparison, 100 weight part of the conventionally available platelike magnetic powder of barium ferrite (D=0.08 $\mu m$, D/t=6, $\mu s$=57.4 emu/g, Hc=760 Oe) was used to manufacture a magnetic tape in the same manner as above. No.5* of Table 5 shows the results of the reproduction output power investigated.

As soon from Table 5, as compared with the magnetic tape manufactured from the conventional barium ferrite magnetic powder, the magnetic tape manufactured by using the magnetic powder of the example of the present invention shows a considerably small temperature change $\Delta Hc/\Delta T$ of coercive force. Further, as it is apparent from the results of the recording/reproduction experiments, the magnetic tape according to the present invention is a magnetic recording medium which is capable of maintaining the large reproduction output power up to high frequency range.

As have been described above, according to the present invention, it is possible to provide a magnetic recording medium which has excellent magnetic characteristics of environmental resistance and high output power in short wave-length range suitable for high density recording.

What is claimed is:

1. An iron oxide magnetic powder of platelike particles, having a composition expressed by the formula:

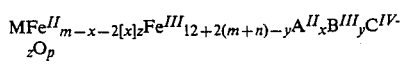

where: M is a metallic element comprising at least one

TABLE 5

| Sample No. | Magnetic particle used for magnetic tape | Temperature coefficient of coercive force $\Delta Hc/\Delta T/$(Oe/ deg) (20 to 80° C) | Reproduction output at 7.5 MHz (dBm) | Reproduction output at 10 MHz (dBm) |
|---|---|---|---|---|
| 1 | Mp-4 | +0.5 | −38.1 | −39.7 |
| 2 | MP-10 | +0.1 | −36.0 | −37.8 |
| 3 | MPH-5 | −0.3 | −39.0 | −41.2 |
| 4 | MPC-4 | +0.1 | −36.2 | −37.2 |
| 5* | Commercially available barium ferrite | +4.5 | −45.0 | −58.0 | of Ba, Sr, Pb and Ca; A is at least one metallic element selected from the group consisting of Co, Cu, Ni, Zn and Mn; B is at least one metallic element selected from the group consisting of Cr, Al and In; C is at least one metallic element selected from the group consisting of Ti, Zr, Ge and Sn; x is 0.70 to 1.86; y is 0 to 0.11; z is 0.70 to 1.80; p is a number of oxygens satisfying electric neutrality; and each of m and n is a positive number satisfying the relation: $21.30 \geq 12 + 3m + 2n - z \geq 14.90$, wherein each of the particles has a magnetoplumbite and spinel crystal structure, in which layers each comprising R blocks and layers each comprising S blocks are alternately arranged, where: each of the R blocks is defined as a crystal block which contains $Fe^{3+}$ ions and has, in parallel with a c plane of the magnetoplumbite structure, three layers in which a layer containing one $M^{2+}$ ion and three $O^{2-}$ ions is arranged between two layers each containing nine $O^{2-}$ ions; and each of the S blocks is defined as a crystal block which contains $Fe^{3+}$ ions and has, in parallel with the c plane, two symmetrical layers each containing four $O^{2+}$ ions, and wherein, in each of the particles, part of the R blocks are lacking in $M^{2+}$ ions such that said part is replaced by S blocks to reduce the number of the R blocks whereby the number of the S blocks is larger than that of the R blocks.

2. An iron oxide magnetic powder according to claim 1, wherein the diameter of each of the particle is 0.03 to 0.15 $\mu m$ and the average value of particle diameter/ thickness is 2 to 18.

3. An iron oxide magnetic powder according to claim 1, wherein, in a temperature range of 15° to 100° C., the temperature coefficient of the coercive force ($\Delta Hc/\Delta T$) is in a range of −1 to +1.

4. An iron oxide magnetic powder according to claim 1, wherein the saturation magnetization value $\sigma s$ is 50.8 to 67.0 emu/g, the coercive force Hc is at most 1410 Oe, and axis which can be easily magnetized is in a perpendicular direction to the plate surface.

5. A recording medium which is manufactured by coating a non-magnetic carrier with an iron oxide magnetic powder of claim 1 and a resin binder.

* * * * *